(12) United States Patent
Imai et al.

(10) Patent No.: US 6,219,525 B1
(45) Date of Patent: Apr. 17, 2001

(54) ACCESS NETWORK SYSTEM CAPABLE OF REDUCING CALL LOSS PROBABILITY

(75) Inventors: Takeshi Imai; Masaaki Nemoto; Hiroshi Matsuyama, all of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/170,058

(22) Filed: Oct. 13, 1998

(30) Foreign Application Priority Data

Mar. 13, 1998 (JP) .................................................. 10-063414

(51) Int. Cl.⁷ ...................................................... H04H 1/00
(52) U.S. Cl. .......................... 455/3.05; 455/509; 455/560
(58) Field of Search ................................... 455/450, 452, 455/445, 453, 509, 510, 519, 560, 3.05

(56) References Cited

U.S. PATENT DOCUMENTS

| | | | |
|---|---|---|---|
| 4,803,679 | 2/1989 | Shimizu | 370/95 |
| 5,173,933 | * 12/1992 | Jabs et al. | 379/58 |
| 5,226,071 | * 7/1993 | Bolliger et al. | 379/60 |
| 5,574,977 | * 11/1996 | Joseph et al. | 455/450 |
| 5,799,012 | * 8/1998 | Ayerst et al. | 370/336 |

FOREIGN PATENT DOCUMENTS

| | | |
|---|---|---|
| 0 311 966 | 4/1989 | (EP) . |
| 60-53339 | 3/1985 | (JP) . |
| 4216221 | 8/1992 | (JP) . |

* cited by examiner

*Primary Examiner*—William G. Trost
*Assistant Examiner*—Blane J. Jackson
(74) *Attorney, Agent, or Firm*—Leydig, Voit & Mayer, Ltd.

(57) ABSTRACT

An access network system capable of reducing loss probability in an access network which is connected on one hand to a service node of an existing network through subscriber lines, and on the other hand to multiple user terminals, and has a concentrating function. A WAC (Wireless local loop Access Controller, that is, a controller of the access network) connected with the service node (local switch) receives from a base station a notification that no idle wireless channel is present if a wireless circuit is busy when the service node makes a call request, and receives from the base station a notification that an idle wireless channel is present when the base station detects it in the wireless circuit. If the WAC receives the channel busy notification, or cannot detect an idle channel in a trunk line, the WAC reserves a call processing. If the WAC receives the notification that an idle wireless channel is present, or detects an idle channel in the trunk line, and if the current subscriber line from the service node still holds the incoming call state, the WAC releases the reservation of the call processing, and performs a repeated call processing for the call request when the call request is still present.

6 Claims, 8 Drawing Sheets

ACCESS NETWORK SYSTEM CAPABLE OF REDUCING CALL LOSS PROBABILITY

BACKGROUND OF THE INVENTION

1. Field of the Invention

The present invention relates to an access network system that is connected to an existing local switch, includes a base station connected through a wireless circuit with fixed terminals such as user terminals installed in subscriber's houses, and is employed as an access network like a WLL (wireless local loop) with a function of concentrating user channels. Here, the access network refers to a network that connects the local switch of a caller with a called user, excluding the local switch and the user terminal themselves.

2. Description of Related Art

Figure 7:
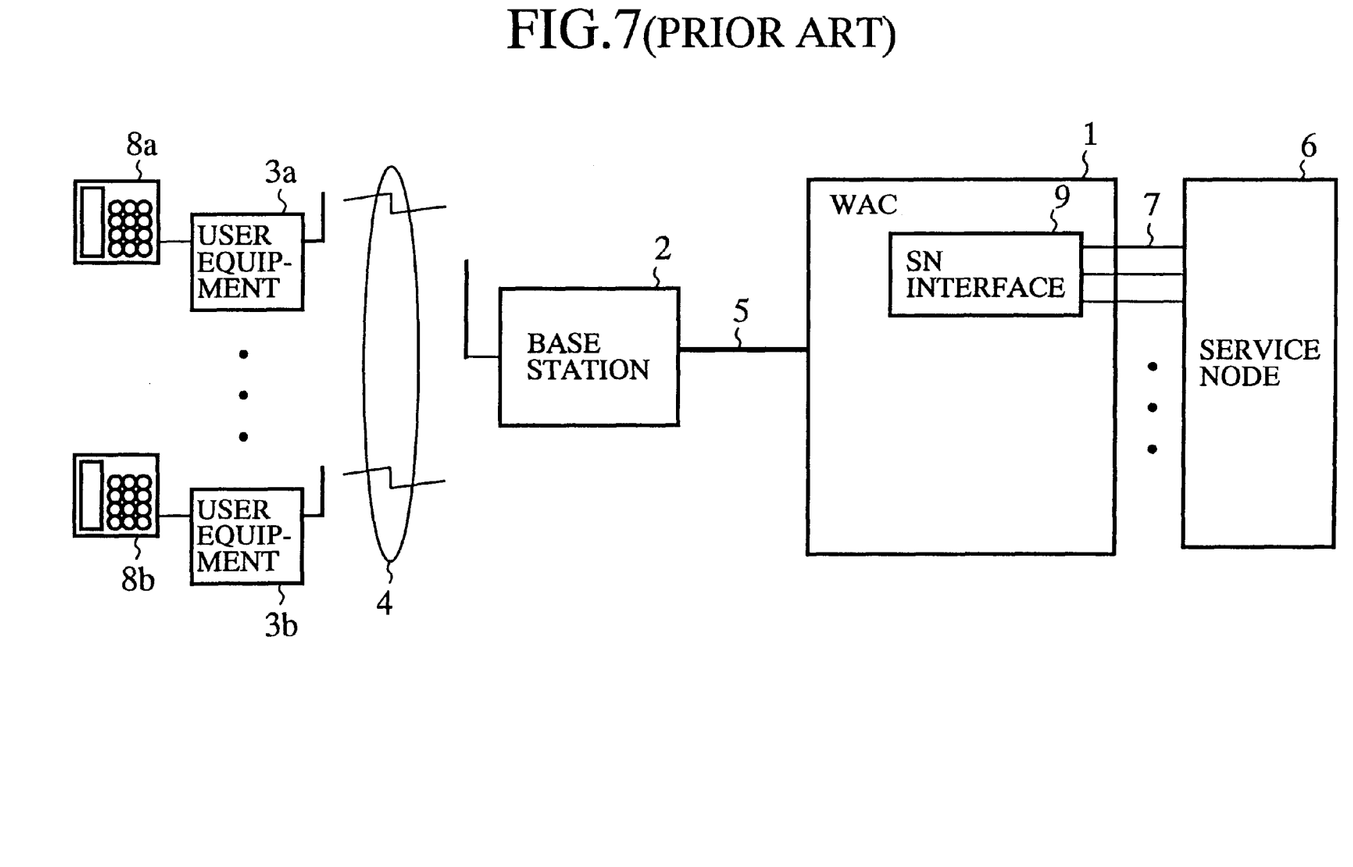
FIG. 7 is a block diagram showing a configuration of a conventional access network like a WLL (wireless local loop)

FIG. 7 is a block diagram showing a configuration of a conventional access network like a WLL. In FIG. 7, the reference numeral 1 designates a WAC (WLL Access Controller) which is the controller of a WLL; and 2 designates a base station that is connected with the WAC 1 through a trunk line 5. The reference numerals 3a–3b each designate user equipment connected with the base station 2 through a wireless circuit 4; and the reference numeral 6 designates a service node including the local switch. The reference numerals 7 each designate a subscriber line connecting the WAC 1 with the service node 6; 8a–8b each designate a user terminal connected to the user equipment; and the reference numeral 9 designates a service node interface installed in the WAC 1 for interfacing the WAC 1 to the service node 6. This configuration shows an example in which the subscriber lines 7 use analog lines.

Figure 8:
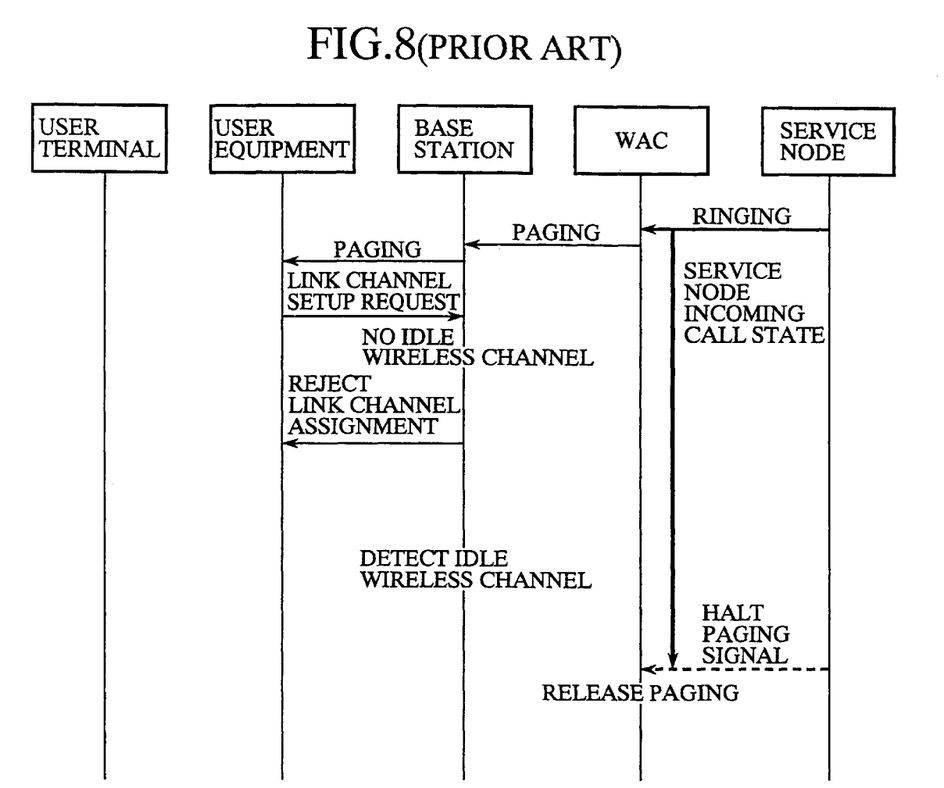
FIG. 8 is a sequence diagram illustrating the operation of the conventional access network as shown in FIG. 7, when a service node 6 makes an incoming call request, but a base station 2 detects a channel busy state in the access network.

Next, the operation of the conventional access network will be described with reference to FIG. 8, a sequence diagram illustrating the operation of the conventional access network as shown in FIG. 7, when a call request takes place from the service node 6 but the base station 2 detects a channel busy state in the access network.

First, the service node 6 issues a ringing (call request) to the WAC 1, and switches the state of the current subscriber line 7 connecting the service node 6 with the WAC 1 into an incoming call state. Receiving the ringing from the service node 6, the WAC 1 transmits a paging message to the all of the base stations 2. When each of the user equipment 3 accepts the paging from the service node 6 through the base station 2, it sends a link channel setup request back to the base station 2 to request a setup of a wireless channel. Receiving the link channel setup request from the user equipment 3, the base station 2 checks whether any idle channel is present in the wireless circuit 4. If the base station 2 cannot detect any idle channel in the wireless circuit 4, it sends back to the user equipment 3 a link channel assignment rejection response indicative of being unable to setup a wireless channel.

Even if the base station 2 detects an idle channel afterward, it cannot complete the incoming call to user equipment 3 because the base station 2 does not include any means for carrying out the call processing again. In the course of time, in response to the abandonment of the call by an originating terminal, the service node 6 switches the subscriber line 7 from the incoming call state to a normal state, and stops the paging signal. Detecting the halt of the paging signal by the service node 6, the WAC 1 releases the paging.

With such an arrangement, the conventional access network system cannot complete the call to the user equipment 3, when the service node 6 makes a call request, but the wireless circuit 4 between the base station 2 and the called user equipment 3 is busy (no idle channel is present in the wireless circuit 4), or the trunk line 5 between the WAC 1 and the base station 2 is busy. In addition, even if the base station 2 detects an idle channel afterward, it cannot complete the calling processing again, in spite of the incoming call state of the current subscriber line 7 of the service node 6, because the base station 2 does not comprise any means for carrying out the call processing subsequently. This presents a problem of increasing call loss.

SUMMARY OF THE INVENTION

The present invention is implemented to solve the foregoing problem. It is therefore an object of the present invention to provide an access network system that can reduce the probability of the loss of a call made by the service node during a busy state of the trunk line or wireless circuit in the access network.

According to a first aspect of the present invention, there is provided an access network system comprising: a controller of an access network, which is connected to a local switch through subscriber lines, and has a concentrating function of the lines; a base station that is included in the access network, and is connected to the controller; and at least one user equipment that is connected to the base station through a wireless circuit, and is connected to a user terminal, wherein the base station comprises: first notification means for notifying the controller of an absence of an idle wireless channel when no available channel is present in the wireless circuit between the user equipment and the base station at a time when the local switch makes a call request to the user terminal; monitor means for detecting an idle wireless channel in the wireless circuit; and second notification means for notifying the controller of a presence of an idle wireless channel when the monitor means detects an idle wireless channel, and wherein the controller comprises: call processing reserving means for reserving a call processing of the call request when the absence of the idle wireless channel is notified; and call processing means for releasing, when the presence of the idle wireless channel is notified, the reservation of the call processing, and for carrying out a call processing to the user equipment through the base station, when the call request still continues.

According to a second aspect of the present invention, there is provided an access network system comprising: a controller of an access network, which is connected to a local switch through subscriber lines, and has a concentrating function of the lines; a base station that is included in the access network, and is connected to the controller; and at least one user equipment that is connected to the base station through a wireless circuit, and is connected to a user terminal, wherein the base station comprises: notification means for notifying the controller of an absence of an idle wireless channel when no available channel is present in the wireless circuit between the user equipment and the base station at a time when the local switch makes a call request to the user terminal, and wherein the controller comprises: call processing reserving means for reserving a call processing of the call request when the absence of the idle wireless channel is notified by the notification means; a timer for counting a predetermined timer value; call processing means for starting the timer at a beginning of a reservation of the call processing, for releasing, when the timer completes counting of the predetermined timer value, the reservation of the call processing, and for carrying out the call processing to the user equipment through the base station, when the call request still continues; and timer restart means for restarting the timer with reserving the call processing of the call request a second time when the absence of the idle wireless channel is notified again.

According to a third aspect of the present invention, there is provided an access network system comprising: a controller of an access network, which is connected to a local switch through subscriber lines, and has a concentrating function of the lines; a base station that is included in the access network, and is connected to the controller; and at least one user equipment that is connected to the base station through a wireless circuit, and is connected to a user terminal, wherein the base station comprises: first notification means for notifying the controller of an absence of an idle wireless channel when no available channel is present in the wireless circuit between the user equipment and the base station at a time when the local switch makes a call request to the user terminal; first monitor means for detecting an idle wireless channel in the wireless circuit; and second notification means for notifying the controller of a presence of an idle wireless channel when the first monitor means detects an idle wireless channel, and wherein the controller comprises: call processing reserving means for reserving a call processing of the call request; second monitor means for detecting an idle channel in a trunk line that connects the base station with the controller; and call processing means for releasing, when the second monitor means detects an idle channel in the trunk line, the reservation of the call processing, and for carrying out a call processing to the user equipment through the base station, when the call request still continues.

Here, the access network system may further comprise means for releasing the reservation of the call processing for the call request, when the local switch disconnects the call request during the reservation of the call processing, wherein the call processing means may complete the call processing when the call reservation is released.

DETAILED DESCRIPTION OF THE PREFERRED EMBODIMENTS

The invention will now be described with reference to the accompanying drawings.

EMBODIMENT 1

Figure 1:
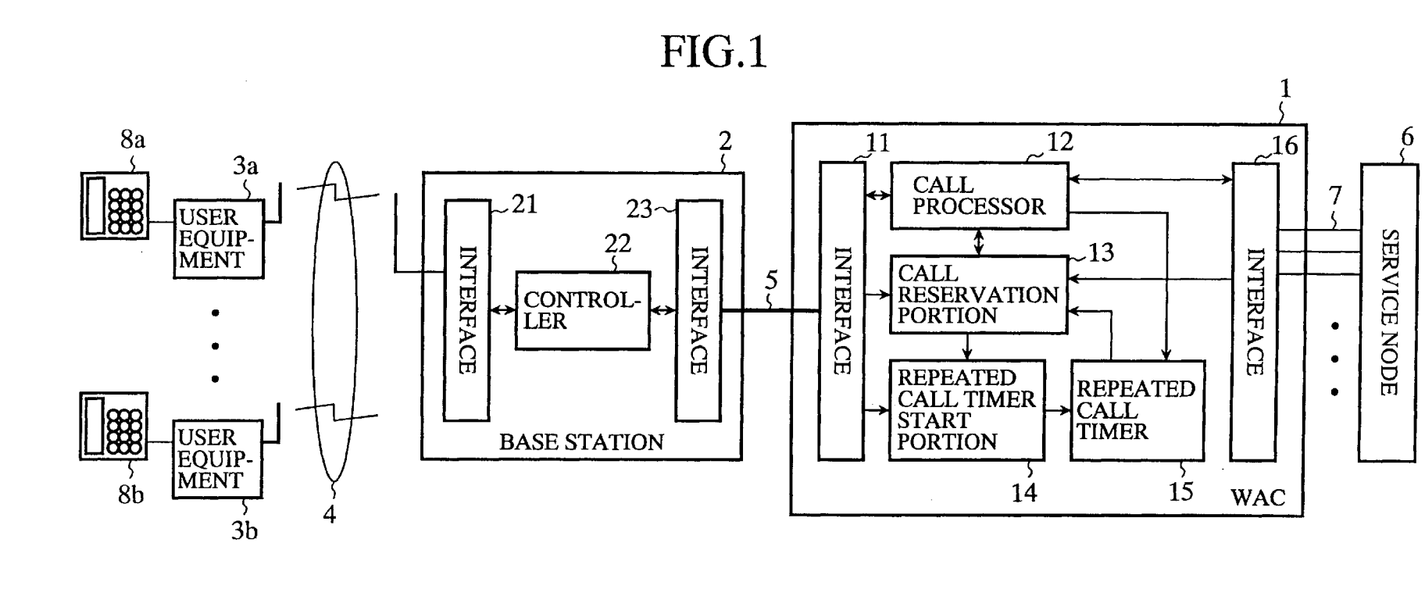
FIG. 1 is a block diagram showing the entire configuration of embodiments 1–4 of an access network system in accordance with the present invention.

FIG. 1 is a block diagram showing the entire configuration of an access network system like a WLL (wireless local loop) in accordance with the present invention. In FIG. 1, the reference numeral 1 designates a WLL access controller (WAC) of the network like a WLL. The WAC 1 is connected on one hand with a service node 6 of an existing network through subscriber lines 7, and on the other hand with a base station 2 (usually, with a plurality of base stations) through a trunk line 5. The base station 2 accommodates a plurality of user equipment 3a–3b through a wireless circuit 4. The user equipment 3a–3b are connected with user terminals 8a–8b which provide communication services, respectively.

The base station 2 comprises an interface 21, a controller 22 and an interface 23. The interface 21 interfaces the base station 2 with the wireless circuit 4. Besides, the interface 21 monitors the wireless circuit 4 to detect an idle channel in the wireless circuit 4. The controller 22 controls the entire processing of the base station 2. In particular, when the service node 6 makes a call request to the base station 2, the controller 22 notifies the WAC 1 that no idle channel is present in the wireless circuit 4 if the interface 21 cannot detect any available channel in the wireless circuit 4, and notifies the WAC 1 that an idle channel is detected when the interface 21 detects it. The interface 23 interfaces the base station 2 with the WAC 1.

The WAC 1 comprises an interface 11, a call processor 12, a call reservation portion 13, a repeated call timer start portion 14, a repeated call timer 15 and an interface 16. The interface 11 interfaces the WAC 1 with the base station 2, and monitors the trunk line 5 to detect whether there is any idle channel in the trunk line 5. The call reservation portion 13 reserves a call processing of call request when it receives a notification from the base station 2 through the interface 11 that there is no idle channel in the wireless circuit 4, or from the interface 11 that no idle channel is detected in the trunk line 5, and releases the call processing reservation when any idle channel is detected in the wireless circuit 4 and trunk line 5. In addition, it releases the call processing reservation when the call is disconnected by the service node 6. The call processor 12 carries out the entire processing associated with the call. In particular, the call processor 12 carries out the call processing for the user equipment 3a–3b when it receives from the base station 2 the notification that an idle channel is detected in the wireless circuit 4 during the call processing reservation. The repeated call timer start portion 14 reserves once again the processing of the call request and activates the timer 15, if the interface 11 cannot detect any idle channel in the wireless circuit 4 again. The timer 15 counts a predetermined time interval for the call processing reservation. When the timer completes the counting, the call processor 12 has the repeated call timer start portion 14 release the call processing reservation, and carries out the call processing once again after confirming the presence of the call. The interface 16 interfaces the WAC 1 with the service node 6 through the subscriber lines 7. Thus, the WAC 1 controls the entire user equipment 3a–3b connected to the base station 2.

Figure 2:
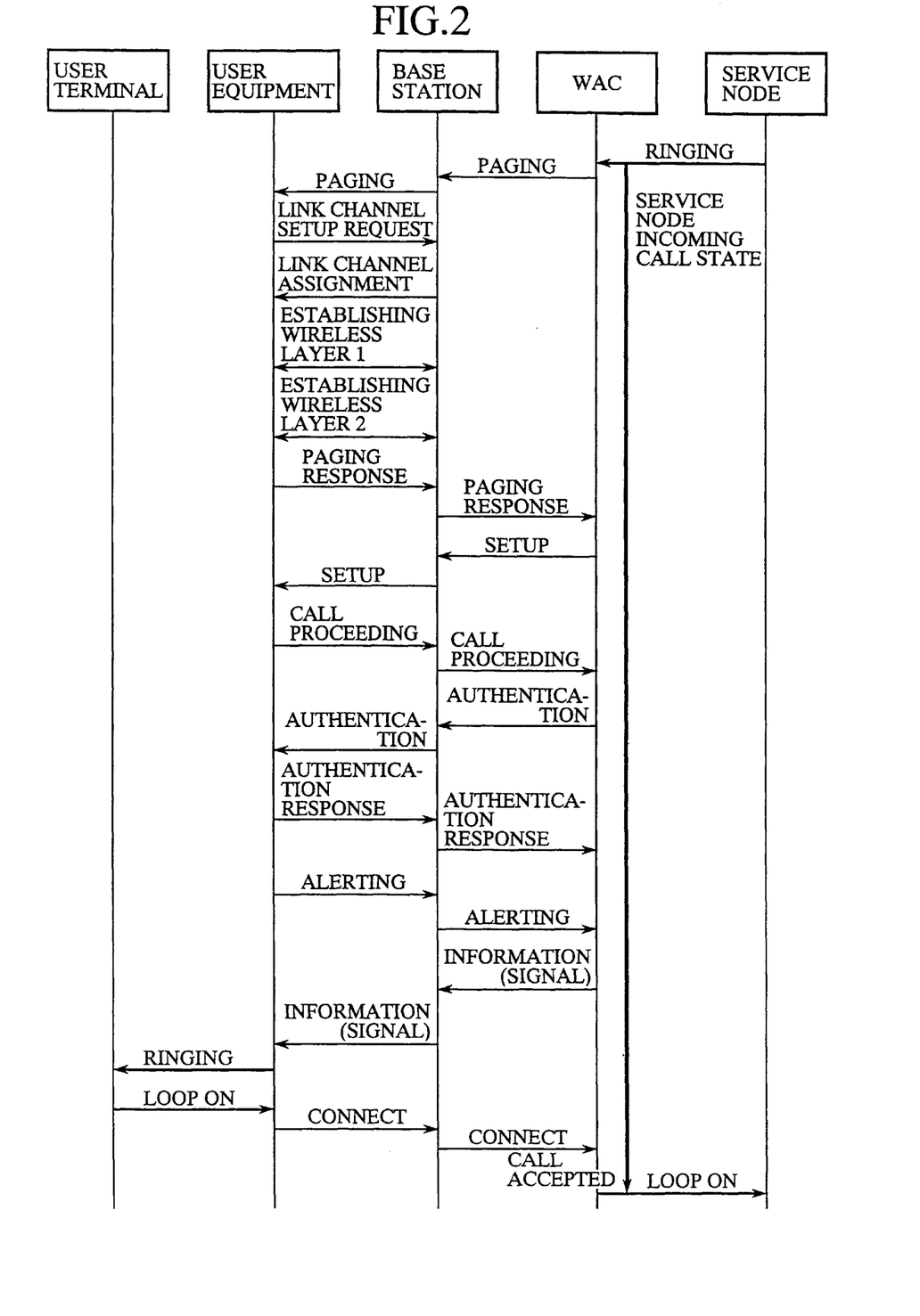
FIG. 2 is a sequence diagram illustrating normal call processing in the access network system as shown in FIG. 1.

FIG. 2 is a sequence diagram illustrating normal operation of an incoming call to one of the user equipment 3 i.e., a request for of the access network as shown in FIG. 1, which is carried out when no channel busy is present in the wireless circuit 4 and trunk line 5. The normal incoming call sequence as illustrated in FIG. 2 is an example when the subscriber lines 7 are analog channels, and user terminals 8a–8b are analog terminals. In addition, the wireless circuit interface between the base station 2 and the user equipment 3a–3b is assumed to be PHS (Personal Handy-phone System) wireless circuit, which is shown as a mere example, and can be replaced with an alternative interface. FIGS. 1 and 2 are used in the following descriptions of the other embodiments, as well.

When the WAC 1 receives a ringing (call request) from the service node 6, the call processor 12 of the WAC 1 sends a paging message to the called user equipment 3 via the base station 2. Receiving the paging message, the base station 2 transmits it to the user equipment 3 via the wireless circuit 4. Receiving the paging message from the base station 2, the user equipment 3 sends to the base station 2 a link channel setup request for requesting setup of a wireless channel between them.

If the base station 2 holds, when it receives the link channel setup request from the user equipment 3, a wireless channel to be assigned, it sends to the user equipment 3 a link channel assignment response indicative of setting up the wireless channel. Subsequently, if wireless layers have been established in this order between the base station 2 and the user equipment 3, the user equipment 3 sends back to the base station 2 a paging response message indicating that the paging sequence has been successfully completed. Receiving the paging response message, the base station 2 sends it to the WAC 1.

When the WAC 1 receives the paging response message, it sends back to the base station 2 a setup message for setting up the call. Receiving the setup message, the base station 2 transmits to the user equipment 3 a setup message for setting up the call. Receiving the setup message, the user equipment 3 carries out setup processing, and sends a call proceeding message back to the base station 2 as a response. When the base station 2, receives the call proceeding message, it sends a call proceeding message back to the WAC 1. Afterward, the WAC 1 carries out, with the user equipment 3, through the base station 2 an authentication check and a predetermined signal sequence, thereby establishing connection between them.

Figure 3:
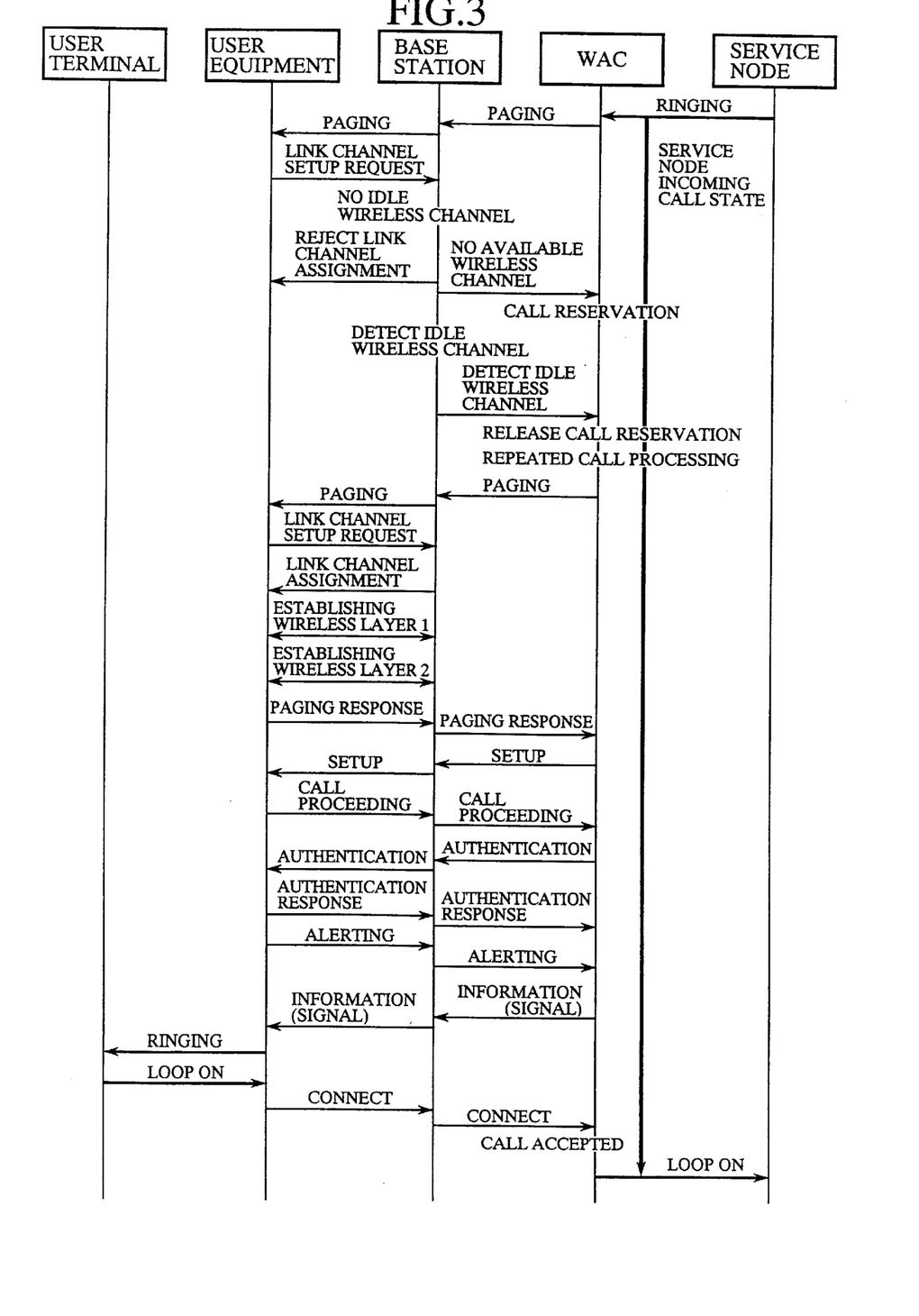
FIG. 3 is a sequence diagram of the embodiment 1 of the access network system in accordance with the present invention.

FIG. 3 is a sequence diagram illustrating the operation of a first embodiment of the access network system in accordance with the present invention. When the WAC 1 receives a ringing (call request) from the service node 6, the call processor 12 of the WAC 1 sends a paging message to the called user equipment 3 via the base station 2. Receiving the paging message, the base station 2 transmits it to the user equipment 3 via the wireless circuit 4. Receiving the paging message from the base station 2, the user equipment 3 sends to the base station 2 a link channel setup request for requesting setup of a wireless channel between them.

If the interface 21 of base station 2 does not hold, when it receives the link channel setup message from the user equipment 3, i.e., a request for a wireless channel to be assigned, then the controller 22 sends to the user equipment 3 a link channel assignment rejection indicative of being unable to setup a wireless channel, and to the WAC 1 an idle wireless channel absent message.

Incidentally, if the base station 2 detects no idle channel in the wireless circuit 4 when it receives the paging message from the WAC 1, it can send the idle wireless channel absent message to the WAC 1 without transmitting the paging message to the user equipment 3.

The interface 21 of the base station 2 starts searching for an idle wireless channel when the interface 23 transmits the idle wireless channel absent message to the WAC 1, and when the interface 21 detects an idle wireless channel, the controller 22 of the base station 2 sends an idle wireless channel detection message to the WAC 1 through the interface 23.

When the WAC 1 receives the idle wireless channel absent message from the base station 2, the call reservation portion 13 of the WAC 1 sets the incoming call in a call reservation state. Subsequently, receiving the idle wireless channel detection message from the base station 2, the call reservation portion 13 releases the call reservation, and the call processor 12 carries out, if the current subscriber line 7 from the service node 6 is still in the call state, call processing again by sending the paging message to the base station 2, thereby completing the call successfully. Since the following sequence as shown in FIG. 3 is the same to that of FIG. 2, description thereof will be omitted here.

In the first embodiment carries out the call processing is carried out again by notifying the WAC 1 of the detection of the idle channel, even if an idle channel is not detected when the service node of the existing network first makes a call request to the access network. This offers an advantage of being able to reduce the call loss for the incoming call.

EMBODIMENT 2

Figure 4:
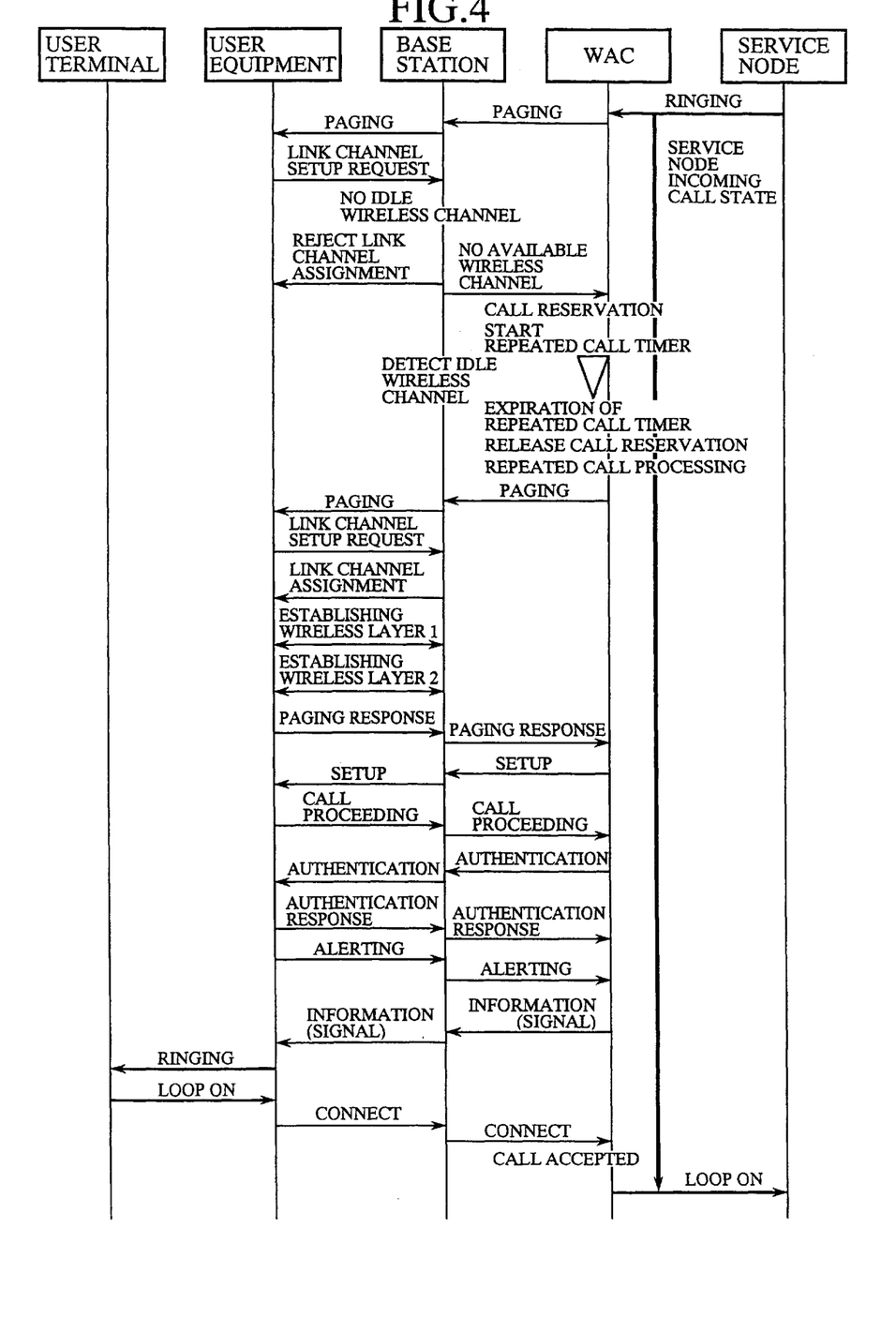
FIG. 4 is a sequence diagram of the embodiment 2 of the access network system in accordance with the present invention.

FIG. 4 is a sequence diagram illustrating a second embodiment of the access network system in accordance with the present invention. The sequence is the same as that of FIG. 3 from the transmission of the ringing from the service node 6 to the WAC 1 up to the transmission of the idle wireless channel absent message from the base station 2 to the WAC 1 when the base station 2 cannot detect an idle wireless channel. When the WAC 1 receives the idle wireless channel absent message from the base station 2, the call reservation portion 13 of the WAC 1 sets the current incoming call in the call reservation state, and activates the repeated call timer 15 using a timer value stored in the repeated call timer start portion 14 in advance.

If the current subscriber line 7 of the service node is still in the incoming call state when the repeated call timer 15 completes counting, the call reservation portion 13 of the WAC 1 releases the call reservation state, and the call processor 12 carries out the repeated call processing to the base station 2, thereby achieving the incoming call successfully. Since the sequence following this in FIG. 4 is the same to that of the normal incoming call processing as shown in FIG. 3, the description thereof is omitted here.

When the WAC 1 receives the idle wireless channel absent message again from the base station 2 during the repeated call processing, the call reservation portion 13 sets the incoming call in the call reservation state again, and reactivates the repeated call timer 15 to retry the repeated call processing.

The second embodiment causes the WAC 1 to carry out the repeated call processing at a fixed interval, even if an idle channel is not detected when the service node 6 of the existing network makes a call request to the access network. This offers an advantage of being able to reduce call loss more easily than the first embodiment.

EMBODIMENT 3

Figure 5:
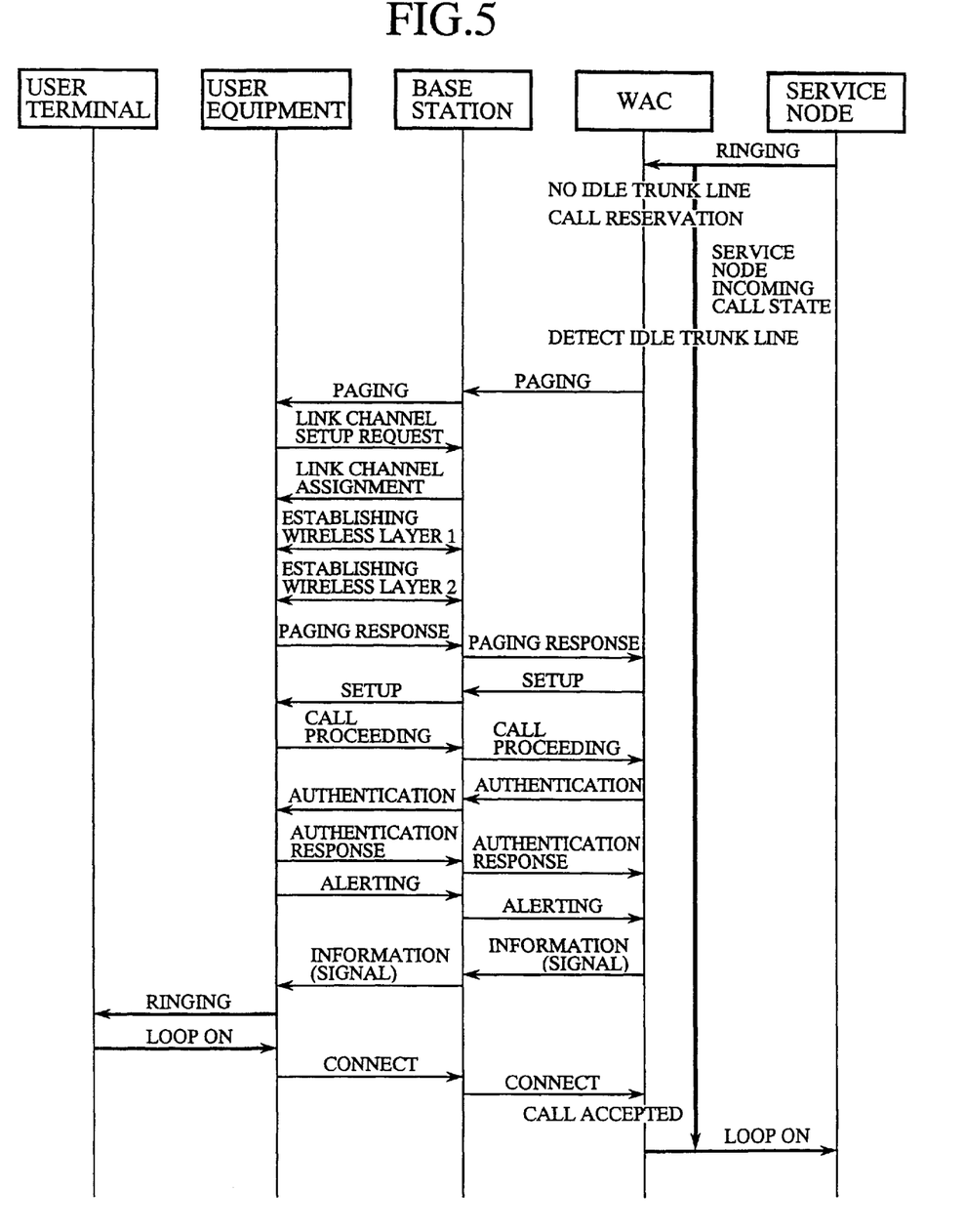
FIG. 5 is a sequence diagram of the embodiment 3 of the access network system in accordance with the present invention.

FIG. 5 is a sequence diagram illustrating the operation of a third embodiment of the access network system in accordance with the present invention. If the trunk line 5 between the WAC 1 and base station 2 that accommodates the called user equipment 3 is busy when the WAC 1 receives the ringing from the service node 6, the call reservation portion 13 of the WAC 1 sets the current incoming call in the reservation state, and the interface 11 of the WAC 1 starts idle channel monitoring to detect whether any channel in the trunk line 5 becomes idle. If the interface 11 of the WAC 1 detects an idle channel in the trunk line 5, the call reservation portion 13 releases the call reservation of the current incoming call, and the call processor 12 carries out the normal call processing as shown in FIG. 2, thereby achieving the incoming call successfully.

In the third embodiment, if the WAC 1 cannot obtain an idle channel in the trunk line 5 between the WAC 1 and base station 2 when the service node 6 of the existing network makes a call request to the access network, and detects an idle channel in the trunk line 5 afterward, the WAC 1 carries out the repeated call processing. This offers an advantage of reducing the occurrences of losses of incoming calls.

EMBODIMENT 4

Figure 6:
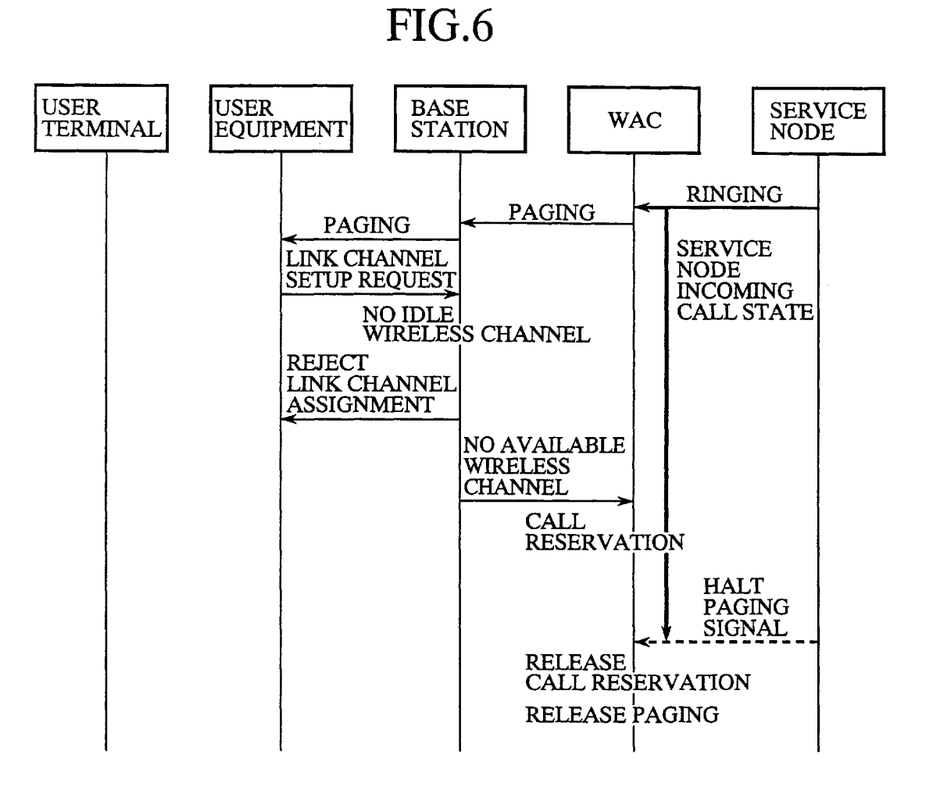
FIG. 6 is a sequence diagram of the embodiment 4 of the access network system in accordance with the present invention.

FIG. 6 is a sequence diagram illustrating a fourth embodiment of the access network system in accordance with the present invention. This is a case in which an incoming call from the service node 6 is disconnected from the current subscriber line 7. In FIG. 6, the operation up to the call reservation is the same to that of the first and second embodiments. If the incoming call from the service node 6 is disconnected from the subscriber line 7, the call reservation portion 13 of the WAC 1 releases the reservation of the incoming call, thereby setting the WAC 1 in an idle state (incoming call released state).

This makes it possible to eliminate an invalid reservation of an incoming call when that incoming call is disconnected from the service node 6.

What is claimed is:

1. An access network system comprising:
   a controller for an access network, the controller connecting to a local switch through subscriber lines, and concentrating the subscriber lines;
   at least one base station connecting to said controller; and
   at least one unit of user equipment connecting to said base station through a wireless circuit, and connecting to a user terminal,
   wherein said base station comprises:
     first notification means for notifying said controller of an absence of an idle wireless channel when no available channel is present in the wireless circuit between said user equipment and said base station when the local switch makes a call request to said user terminal, and
   wherein said controller comprises:
     call processing reserving means for reserving call processing of the call request when said first notification means notifies said controller of the absence of an idle wireless channel;
     a timer for counting to a timer value;
     call processing means for starting said timer at a beginning of a reservation of the call processing of the call request, for, when said timer completes counting to the timer value, releasing the reservation of the call processing of the call request, and for carrying out the call processing of the call request to said user equipment through said base station, if the call request continues; and
     timer restart means for restarting said timer in response to reserving the call processing of the call request a second time when said first notification means renotifies said controller of the absence of an idle wireless channel.

2. The access network system according to claim 1 wherein said base station comprises
   monitor means for detecting an idle wireless channel in the wireless circuit; and
   second notification means for notifying said controller of a presence of an idle wireless channel when said monitor means detects an idle wireless channel, wherein said controller comprises
     said call processing means for, when said second notification means notifies said controller of the presence of the idle wireless channel, releasing the reservation of the call processing of the call request, and for carrying out the call processing of the call request to said user equipment through said base station, if the call request continues.

3. The access network system as claimed claim 2, comprising means for releasing the reservation of the call processing for the call request when said local switch disconnects the call request during the reservation of the call processing, wherein said call processing means completes the call processing when the call reservation is released.

4. The access network system according to claim 1 wherein said base station comprises:
   first monitor means for detecting an idle wireless channel in the wireless circuit; and
   second notification means for notifying said controller of a presence of an idle wireless channel when said first monitor means detects an idle wireless channel, wherein said controller comprises:
     said call processing reserving means for reserving call processing of the call request; and
     second monitor means for detecting an idle channel in a trunk line connecting said base station with said controller, said call processing means for, when said second monitor means detects an idle channel in said trunk line, releasing the reservation of the call processing of the call request, and for carrying out the call processing of the call request to said user equipment through said base station, when the call request continues.

5. The access network system as claimed claim 4, comprising means for releasing the reservation of the call processing for the call request when said local switch disconnects the call request during the reservation of the call processing, wherein said call processing means completes the call processing when the call reservation is released.

6. The access network system as claimed claim 1, comprising means for releasing the reservation of the call processing for the call request when said local switch disconnects the call request during the reservation of the call processing, wherein said call processing means completes the call processing when the call reservation is released.

* * * * *